(12) United States Patent
Contreras De Leon et al.

(10) Patent No.: US 10,011,533 B2
(45) Date of Patent: Jul. 3, 2018

(54) PORCELAIN COMPOSITION WITH NANOSIZED CERAMIC OXIDES

(71) Applicant: PROLEC, S.A. DE C.V., Apodaca (MX)

(72) Inventors: José Eulalio Contreras De Leon, San Nicolás de los Garza (MX); Edén Amaral Rodriguez Castellanos, San Nicolás de los Garza (MX)

(73) Assignee: PROLEC, S.A. DE C.V., Apodaca (MX)

( * ) Notice: Subject to any disclaimer, the term of this patent is extended or adjusted under 35 U.S.C. 154(b) by 0 days.

(21) Appl. No.: 15/311,640

(22) PCT Filed: Dec. 1, 2015

(86) PCT No.: PCT/MX2015/000157
§ 371 (c)(1),
(2) Date: Nov. 16, 2016

(87) PCT Pub. No.: WO2016/089195
PCT Pub. Date: Jun. 9, 2016

(65) Prior Publication Data
US 2017/0260099 A1    Sep. 14, 2017

(30) Foreign Application Priority Data

Dec. 1, 2014    (MX) .................... MX/a/2014/014665

(51) Int. Cl.
*C04B 35/14*      (2006.01)
*C04B 35/64*      (2006.01)
*H01B 3/12*       (2006.01)

(52) U.S. Cl.
CPC .............. *C04B 35/14* (2013.01); *C04B 35/64* (2013.01); *H01B 3/12* (2013.01);
(Continued)

(58) Field of Classification Search
CPC    C03C 3/068; C03C 3/118; C03C 4/00; C03C 8/06; C03C 2204/00; C23D 5/02
See application file for complete search history.

(56) References Cited

U.S. PATENT DOCUMENTS 3,891,452  A  *  6/1975  Low ........................ C03C 3/068
                                                      501/15
4,460,630  A  *  7/1984  Nishino .................... C03C 8/00
                                                      427/376.2
(Continued)

OTHER PUBLICATIONS

Álvarez, "Synthesis and Characterization of Nanometric Alumna," Boletin of Ciencías from Tierra, 2010, No. 28, 11 pages.
(Continued)

*Primary Examiner* — Noah S Wiese
(74) *Attorney, Agent, or Firm* — Morgan, Lewis & Bockius LLP

(57) ABSTRACT

The present invention is related to the development of a new formulation of electrical grade porcelain having improved mechanical and dielectric characteristics, and whose primary application is in electrical components, such as electric insulators. This invention has as its main object to provide a new alternative to increase the final properties of an electrical grade porcelain, which is related to the incorporation of suitable concentrations of nanosized ceramic oxides, as part of the initial composition of porcelain paste. This new nanotechnology alternative favors an increase in the final properties of electrical grade porcelain, such as flexural strength or cold rupture modulus, as well as dielectric strength, which is due to the incorporation of ceramic oxides such as alumina ($\alpha$-$Al_2O_3$) and zirconia ($ZrO_2$), in micrometer scale (i.e., less than 100 nanometers), favorably modify the microstructure of the base porcelain. Mechanical strength, specifically the flexural strength at three points, of the porcelain compositions of the present invention is up to (Continued)

38% greater than a silica based conventional porcelain composition. Furthermore, the insulating ability of the composition of this invention is up to 30% above the value of the reference siliceous porcelain. Another important aspect of this invention is based on the concept that the ceramic nano-oxides of ($\alpha$-$Al_2O_3$) and zirconia ($ZrO_2$) strengthen the microstructure of siliceous porcelain, since the amount of crystalline phase increases and therefore the amorphous phase is reduced. Furthermore, the ceramic nano-oxides favor the increase in the concentration of the crystalline mullite phase ($3Al_2O_3.2SiO_2$) in the microstructure, which is known to benefit the mechanical performance of triaxial porcelains.

3 Claims, 2 Drawing Sheets

(52) U.S. Cl.
CPC ............ *C04B 2235/3217* (2013.01); *C04B 2235/3244* (2013.01); *C04B 2235/349* (2013.01); *C04B 2235/3418* (2013.01); *C04B 2235/5454* (2013.01); *C04B 2235/602* (2013.01); *C04B 2235/656* (2013.01); *C04B 2235/96* (2013.01)

(56) References Cited

U.S. PATENT DOCUMENTS

| | | | |
|---|---|---|---|
| 4,717,695 A * | 1/1988 | Oda | C04B 33/26 501/143 |
| 6,475,941 B1 * | 11/2002 | Liebermann | C04B 33/26 501/130 |
| 2002/0155943 A1 | 10/2002 | Liebermann | |
| 2005/0112389 A1 | 5/2005 | Loureiro et al. | |
| 2006/0167164 A1 * | 7/2006 | Sugioka | C08G 59/621 524/492 |

OTHER PUBLICATIONS

Gopi, K.R., "Advances in Nanoalumina Ceramic Particle Fabrication Using Sonofragmentation," IEEE Transactions on Nanotechnology, vol. 7, No. 5, Sep. 2008, pp. 532-537.

* cited by examiner

PORCELAIN COMPOSITION WITH NANOSIZED CERAMIC OXIDES

CROSS-REFERENCE TO RELATED APPLICATIONS

This application is a U.S. national stage of International Patent Application No. PCT/MX2015/000157 filed Dec. 1, 2015 and published as WO 2016/089195 A1, which claims priority to Mexican Patent Application No. MX/a/2014/014665 filed Dec. 1, 2014, the entire contents of which applications is incorporated herein for all purposes by this reference.

BACKGROUND OF THE INVENTION

Ceramic materials have been present in the history of man for many different purposes, from purely decorative applications, to more advanced applications such as structural components. Previously, ceramics was considered as the art of cooked earths, however nowadays involves more complex topics in the field of materials science far exceeding the limits of traditional ceramics.

Specific case are the ceramics used in the manufacture of electrical components. Historically and traditionally, porcelain has been the base ceramic material used to manufacture these products, due to the inherent properties it presents, besides other processing aspects and even for economic reasons. Some of the features that have gave porcelain high value in the electricity industry are: excellent dielectric and mechanical performance, except for the impact, a vitrified structure that resists water absorption, refractory qualities, resistance to oils, vapors, etc., attractive appearance, ease of shaping into different shapes, besides being relatively inexpensive. Coupled with this, the porcelains have advantages over other organic type insulating materials in terms of chemical stability and durability when exposed to high temperatures, damp or contaminated media, besides not undergoing degradation from UV radiation action.

Porcelain for electrical insulators has evolved through history, from the components used as raw materials and their manufacturing processes to optimization of microstructural aspects for specific characteristics in the final product. The siliceous electrotechnical porcelains belong to the triaxial ceramic quartz-clay-feldspar system and develop their characteristic properties to achieve a high degree of vitrification in their microstructure, which occurs after the heat sintering process at temperatures of about 1250° C. Typically, the final microstructure of electric porcelain consists of quartz ($SiO_2$) and mullite ($3Al_2O_3.2SiO_2$) crystals embedded in an amorphous or glassy matrix, as well as the presence of closed porosity.

Triaxial electrical grade porcelain used in this type of insulators in addition to complying with a suitable dielectric behavior, is also essential to present a good mechanical performance when in operation. There are several types of porcelain pastes used to make porcelain electrical insulators, among which triaxial siliceous type paste (C110) and triaxial aluminous type paste (C120), designated by the IEC standard (International Electrotechnical Commission) 60672-1 (Ceramic and glass insulating materials—Part 1: Definitions and classification) are highlighted, which are most commonly used for this specific application. Aluminous pastes have higher mechanical strength values, however they are more expensive than silica based porcelains, because of the alumina concentrations which is used as raw material, and other process aspects, such as higher firing temperatures and increased machinery wear.

It is very important that the porcelain used in electrical insulators have suitable mechanical and insulation properties, so as to ensure product reliability when in operation. In recent years, several researches have been developed to increase the mechanical strength of the electrical porcelains, the most searched fields being strengthening of the porcelain matrix by microstructural modification, the addition of different types of macro-ceramic particles, and the development and application of new enamel formulations.

Recently, with the advent of nanoscience and nanotechnology, new alternative solutions are presented to improve the characteristics and performance of materials in general. In the case of ceramic materials, concepts have been verified based on the use of small additions of nanoscale particles for improving various properties such as mechanical strength, wear resistance, chemical resistance, among other. These studies demonstrate that nanoparticles significantly contribute to the final characteristics of ceramics.

However, the incorporation of nanosized ceramic oxides, has virtually not been considered in reinforcing siliceous porcelain systems, specifically those electrical grade with application in insulators, which represents an alternative to improve the characteristics of electrotechnical porcelains, so as to obtain products with high added value, high reliability and better performance when in operation.

Thus, this invention has as its fundamental objective the development of a porcelain paste nanostructured through the concept of incorporating ceramic oxides at nano-metric level in specific concentrations, having mechanical and dielectric features superior to those of a conventional silica-based electrical porcelain with application in electrical components, such as electrical insulators.

DESCRIPTION OF THE DRAWINGS

For a better understanding of the invention, reference is made to the following figures.

DETAILED DESCRIPTION OF THE INVENTION

Figure 1:
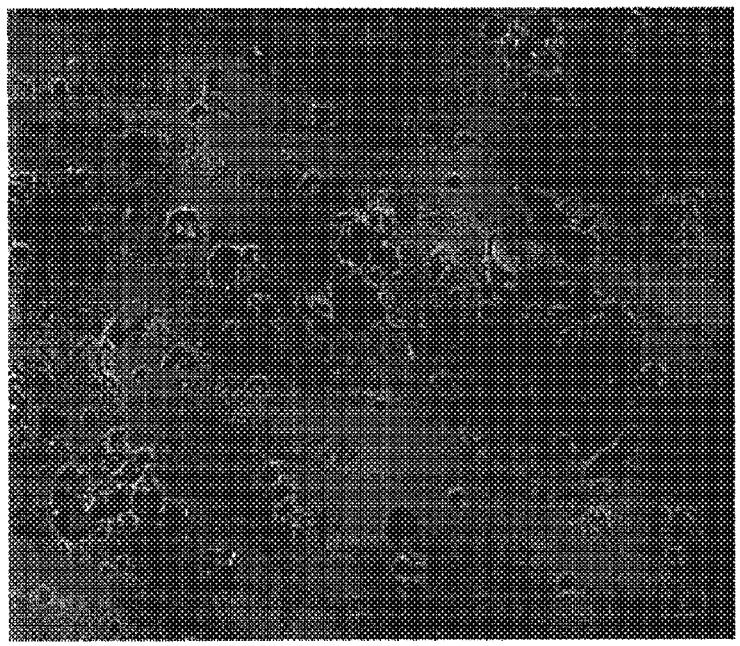
FIG. 1 corresponds to an image of scanning electron microscopy, without etching, of the base or reference porcelain composition.

The present invention will be described in greater detail with reference to the following examples.

EXAMPLE 1

Initial raw materials to produce the porcelain pastes are based on an electrical grade silica-based composition, that is, silicon oxide ($SiO_2$) or quartz, sodium type feldspar, clay and kaolin, as well as the addition of nanosized ceramic oxides, aluminum oxide ($α-Al_2O_3$) or alumina and zirconium oxide ($ZrO_2$) or zirconia. The chemical composition of the initial components used for the manufacture of porcelain pastes are shown in Table 1, while the average particle sizes are shown in Table 2.

TABLE 1

Chemical composition of the initial porcelain formulation components (% by weight)

| | Quartz | Feldspar | Clay | Kaolin | α-$Al_2O_3$ | $ZrO_2$ |
|---|---|---|---|---|---|---|
| $SiO_2$ | 95.41 | 53.95 | 44.925 | 62.696 | 1.010 | 0.00 |
| $Al_2O_3$ | 1.506 | 27.22 | 37.151 | 18.865 | 97.90 | 0.511 |
| $ZrO_2$ | 0.029 | 0.00 | 0.025 | 0.014 | 0.00 | 98.40 |
| $Fe_2O_3$ | 0.083 | 1.49 | 0.578 | 0.273 | 0.864 | 0.255 |
| $K_2O$ | 0.267 | 0.64 | 0.166 | 4.294 | 0.00 | 0.00 |
| $Na_2O$ | 0.315 | 0.31 | 0.00 | 12.156 | 0.00 | 0.00 |
| CaO | 0.221 | 0.24 | 0.574 | 0.793 | 0.127 | 0.00 |
| MgO | 0.00 | 0.52 | 0.277 | 0.00 | 0.00 | 0.00 |
| $TiO_2$ | 0.00 | 0.00 | 1.482 | 0.00 | 0.00 | 0.769 |

TABLE 2

Initial porcelain formulation components

| | Quartz | Feldspar | Clay | Kaolin | α-$Al_2O_3$ | $ZrO_2$ |
|---|---|---|---|---|---|---|
| Average particle size (μm) | 40-50 | 70-80 | 70-80 | 70-80 | 0.03-0.06 | 0.01-0.04 |

Seven silicone porcelain compositions were defined (A-G), which are described in Table 3. Composition A corresponds to the base or reference porcelain paste, compositions B, C and D correspond to the base paste with additions of α-$Al_2O_3$ nanoparticles, while compositions E, F and G correspond to the base paste with $ZrO_2$ nanoparticle aggregates.

TABLE 3

| Initial components | Chemical composition of the initial porcelain formulation components (% by weight) | | | | | | |
|---|---|---|---|---|---|---|---|
| | A | B | C | D | E | F | G |
| Quartz + feldspar | 52.8 | 52.2 | 50.0 | 48.6 | 52.2 | 50.0 | 48.6 |
| Clay + Kaolin | 47.2 | 46.8 | 45.0 | 43.4 | 46.8 | 45.0 | 43.4 |
| n-$Al_2O_3$ | 0 | 1.0 | 5.0 | 8.0 | 0 | 0 | 0 |
| n-$ZrO_2$ | 0 | 0 | 0 | 0 | 1.0 | 5.0 | 8.0 |

The process of preparing reference pastes (A) consisted of mixing the initial components of the triaxial porcelain, quartz, clay, kaolin and feldspar, according to Table 3, using a semi-dry process, with the addition of 15% by weight water of the total mixture. In the case of compositions B-G, ceramic nano-oxides were previously prepared before adding them to the powder mixture of the initial porcelain base components. A dispersant additive based on an acrylic hydrophobic copolymer (OROTAN™ 681) was used for compositions B, C and D, while a polymeric dispersing agent (Zephrym™ PD 3315) was used for compositions E, F and G. Among other dispersants that may also be used are: Crodafos 03A, Crodafos 010A, Oratan™ 850, Triton™ X-100, etc. The mixture of water, dispersing agent and nanoparticles was incorporated in the powder mixture comprised of quartz, clay, kaolin and feldspar, to form porcelain pastes B-G.

Each of the porcelain mixtures were shaped to obtain rectangular specimens (30×30×200 mm) using uniaxial pressure. Then they were dried in an electric oven at a maximum temperature of 120° C. and sintered at a maximum temperature of between 1250 and 1300° C. in a tunnel type industrial furnace.

Table 4 shows the final properties of the porcelain compositions after sintering. The bulk density of the porcelain specimens was obtained according to the test standard ASTM C373 (Standard Test Method for Water Absorption, Bulk Density, Apparent Porosity, and Apparent Specific Gravity of Fired Whiteware Products), using the Archimedes method. The flexural strength or cold rupture modulus (MOR) of the sintered rectangular specimens (26×26×180 mm) was measured according to standard ASTM C674 (Standard Test Methods for Flexural Properties of Ceramic Whiteware Materials) by the method of 3-point bending with a support span of 100 mm.

TABLE 4

Final properties of porcelain composition

| | A | B | C | D | E | F | G |
|---|---|---|---|---|---|---|---|
| Bulk density (g/$cm^3$) | 2.331 | 2.333 | 2.337 | 2.345 | 2.353 | 2.374 | 2.409 |
| Flexural strength after firing (N/$mm^2$) | 32.5 | 43.3 | 42.5 | 44.2 | 38.3 | 41.1 | 44.8 |

As shown in Table 4, the porcelain compositions of this invention B-G, exhibit flexural strength values higher than the reference composition (A). Particularly, compositions B, C and D, which include 1.0, 5.0 and 8.0% by weight of α-$Al_2O_3$ nanoparticles respectively, show an increase in flexural strength of 31-36% compared to composition A. On the other hand, compositions with additions of $ZrO_2$ nanoparticles (compositions E, F and G) showed an increase in flexural mechanical performance from 18 to 38% compared to the reference composition.

Figure 2:
FIG. 2 corresponds to an image of scanning electron microscopy, without etching, of the porcelain composition with the addition of α-alumina nano-oxides.
Figure 3:
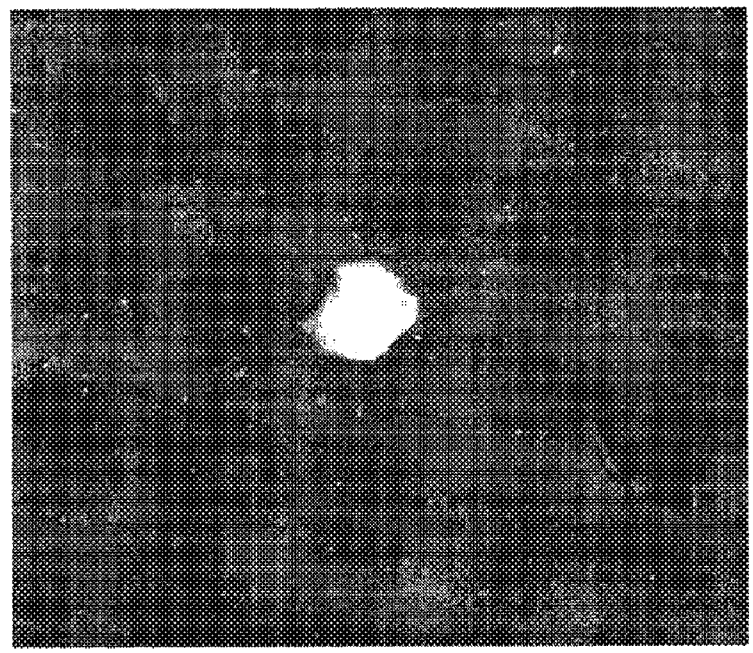
FIG. 3 corresponds to an image of scanning electron microscopy, without etching, of the porcelain composition with addition of zirconia nano-oxides.

FIG. 1 shows a micrograph obtained by electron microscopy (SEM) corresponding to the porcelain base composition (A) without etching, in which a microstructure formed by quartz crystals (1) embedded in a glass matrix (2) are shown, as well as the presence of porosity (3) derived from sintering treatment. FIGS. 2 and 3 show the microstructures corresponding to compositions D and G, wherein a microstructure modified by the nano-oxide ceramics of $Al_2O_3$ (4), and $ZrO_2$ (5), respectively, are shown. As can be seen from comparing FIGS. 1, 2 and 3, the microstructure of porcelains made from the compositions of the present invention have a further crystalline phase, which is embedded in the glass phase.

Figure 4:
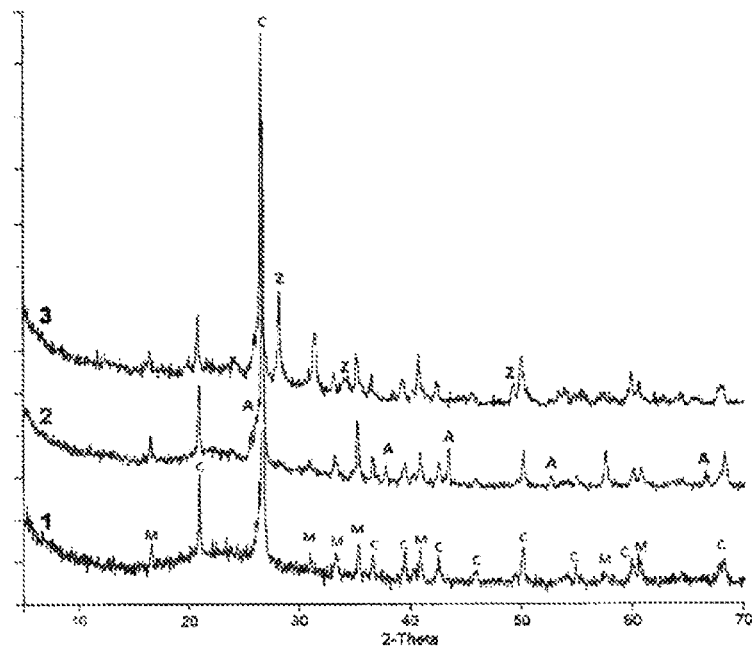
FIG. 4 corresponds to the X-ray diffraction pattern of the base porcelain composition, as compared to the compositions of the present invention.

FIG. 4 comparatively shows the X-ray diffraction patterns of the reference porcelain composition (marked as 1), the porcelain composition with additions of 8% by weight of nanoparticles of α-$Al_2O_3$ (shown as 2) and the composition with 8% by weight of nanoparticles of $ZrO_2$ (indicated as 3). The main peaks correspond to crystal phases of quartz C, mullite M, as well as α-alumina A and zirconia Z phases.

It is clear that the intensity of mullite phase peak ($3Al_2O_3.2SiO_2$) increases in compositions D and G compared to reference porcelain, which corresponds to increasing the flexural strength of the compositions the present invention. This indicates that the incorporation of alumina and zirconia ceramic nano-oxides favorably modifies the microstructure of silica base porcelain, giving improved mechanical strength tot he porcelain body.

EXAMPLE 2

The same concept of incorporating ceramic nano-oxides of $\alpha\text{-}Al_2O_3$ and $ZrO_2$, in the final performance of a composition of silica-based electrical porcelain, was investigated. The starting materials for the preparation of the experimental samples were quartz, clay, kaolin and feldspar, as well as $\alpha$-alumina and zirconia nanoparticles. The chemical composition and particle size of the raw materials are shown in Tables 1 and 2.

Seven prototype porcelain compositions were defined which are described in Table 5. Composition H corresponds to the base or reference porcelain, compositions I, J and K correspond to the base paste with additions of $\alpha\text{-}Al_2O_3$ nanoparticles, while compositions L, M and N correspond to the porcelain base with $ZrO_2$ nanoparticle aggregates.

TABLE 5

| Initial components | Chemical composition of the initial porcelain formulation components (% by weight) | | | | | | |
|---|---|---|---|---|---|---|---|
| | H | I | J | K | L | M | N |
| Quartz + feldespar | 52.8 | 52.72 | 52.50 | 52.24 | 52.72 | 52.50 | 52.24 |
| Clay + Kaolin | 47.2 | 47.17 | 46.98 | 46.74 | 47.17 | 46.98 | 46.74 |
| n-$Al_2O_3$ | 0 | 0.1 | 0.5 | 1.0 | 0 | 0 | 0 |
| n-$ZrO_2$ | 0 | 0 | 0 | 0 | 0.1 | 0.5 | 1.0 |

The method of preparing such compositions was by a wet process, where powders of raw materials are mixed with osmosis water (60-75% by weight of the total mixture) according to Table 5, and adding calcium chloride as an additive in a concentration of 0.01 to 0.08% by weight of the total mixture. The mixing process was performed at a speed of 650-750 rpm for a period of approximately 150 minutes. Subsequently, a magnetic cleaning of the porcelain mixture is made in order to remove residues of oxides, and a screening (150 and 120 mesh) to remove impurities or possible resulting agglomerations.

For compositions of the present invention I-N, to the porcelain base mixture were added the ceramic nano-oxides in concentrations according to Table 5. The nanoparticles were added in two loads, performing an additional mixing of minutes at a speed of 1100 and 1250 rpm. Once the porcelain mixtures were obtained, pastes or "cakes" were formed by a conventional filter-press process, applying a pressure of 1-1.2 MPa. This process allowed to remove excess moisture by leaving it in a range from 16 to 18%. The resulting pastes were formed by a plastic extrusion process, at a speed of 40 mm/min, to obtain cylindrical samples of 28.5 mm diameter×200 mm long. The porcelain specimens were dried at a maximum temperature of 120° C. and sintered at a maximum temperature of between 1250 and 1300° C. in a tunnel type industrial furnace.

The final properties of porcelain compositions are shown in Table 6. The bulk density of the samples was obtained by the Archimedes method, according to standard ASTM C373 (Standard Test Method for Water Absorption, Bulk Density, Apparent Porosity, and Apparent Specific Gravity of Fired Whiteware Products). The percentage of linear shrinkage of the test pieces was determined after the sintering process by measuring changes in length before and after drying and sintering process. The specimens were mechanically tested after the drying process and post-sintering, by 3 point flexural strength testing according to standard ASTM C674 (Standard Test Methods for Flexural Properties of Ceramic Whiteware Materials). The dielectric strength or insulating capacity of porcelain samples was obtained according to standard ASTM D149 (Standard Test Method for Dielectric Breakdown Voltage and Dielectric Strength of Solid Electrical Insulating Materials at Commercial Power Frequencies), using dielectric oil 11GBX (Nynas) as insulating means.

TABLE 6

| | Final properties of porcelain compositions | | | | | | |
|---|---|---|---|---|---|---|---|
| | H | I | J | K | L | M | N |
| Bulk density (g/cm³) | 2.360 | 2.372 | 2.378 | 2.382 | 2.368 | 2.370 | 2.370 |
| Lineal shrinkage after firing (%) | 11.02 | 11.29 | 11.33 | 11.31 | 10.15 | 10.18 | 10.46 |
| Flexural dry strength (N/mm²) | 3.91 | 4.42 | 4.91 | 5.98 | 4.60 | 4.44 | 4.55 |
| Flexural strength after firing (N/mm²) | 63.3 | 69.3 | 72.5 | 76.0 | 71.0 | 71.2 | 71.5 |
| Dielectric strength after firing (kV/mm) | 15.37 | 20.32 | 20.20 | 19.62 | 20.05 | 18.89 | 19.18 |

The bulk density of the compositions of the invention (I-N) is comparable to the density of the reference composition. Porosity tests were made to small fragments of the sintered porcelain, by standard ASTM D116 (Standard Test Methods for Ceramic Materials for Electrical Vitrified Applications), using the fuchsin ink penetration method. The tests indicated that the ink did not penetrate the interior of the porcelain, which indicates that the compositions of the present invention have very low open porosity values, which is an indispensable characteristic for porcelains used in electrical insulators.

It can be clearly seen that the flexural strength of siliceous porcelain increases when ceramic nano-oxides are added. The compositions with additions of $\alpha$-alumina nanoparticles (I, J, K) showed improved flexural strength of 9.5-20%, post-sintering with respect to the base formulation (H). The porcelain compositions with nano-zirconia (L, M, N) showed increases of 12 to 13%.

Table 7 shows the influence of the addition of ceramic nano-oxides of alumina and zirconia at the concentration of the phases present in the microstructure of the compositions of the present invention (K and N) with respect to the reference porcelain.

As can be seen in Table 7, the ceramic nano-oxides have a favorable influence on increasing the mullite phase, as well as the decrease in amorphous phase compared to the base or reference composition. This clearly corresponds to the increased mechanical flexural strength observed in compositions with additions of nanoparticles.

TABLE 7

| | Quantification of porcelain composition phases (% by weight) | | |
|---|---|---|---|
| | H | K | N |
| Vitreous phase | 65 | 60.3 | 61.6 |
| Quartz | 18.2 | 19.5 | 19.7 |
| α-alúmin | 0 | 0.86 | 0 |
| Zirconia | 0 | 0 | 1.01 |

The dielectric strength is also favored by the addition of nanoparticles. In particles, compositions I, J and K showed increases of 28 to 32% with respect to the base porcelain, while in compositions L, M and N the increase was 25 to 30%.

Having claimed the invention as above, it is claimed as property what is contained in the following claims:

1. A silica based porcelain composition with improved microstructure and mechanical and dielectric properties characterized by comprising 48 to 53% by weight of a mixture of silicon oxide and sodium type feldspar material; 43 to 47% by weight of a mixture of kaolinitic clay; and 0.1 to 8.0% by weight of a nanosized ceramic oxide powder.

2. The porcelain composition according to claim 1, wherein the nanosized ceramic oxide powder is aluminum oxide ($\alpha$-$Al_2O_3$) and whose particle size is 30 to 60 nanometers.

3. The porcelain composition according to claim 1, wherein the nanosized ceramic oxide powder is zirconium oxide ($ZrO_2$) and whose particle size is 30 to 60 nanometers.

* * * * *